March 17, 1970     E. R. MORLEY     3,501,656
ROTOR CONSTRUCTION WITH DIRECTIONAL CONTROL
FOR A SYNCHRONOUS A.C. MOTOR
Filed Jan. 7, 1969

INVENTOR.
EDWIN R. MORLEY

BY *Charles Ewarth*

AGENT

United States Patent Office 3,501,656
Patented Mar. 17, 1970

3,501,656
ROTOR CONSTRUCTION WITH DIRECTIONAL CONTROL FOR A SYNCHRONOUS A.C. MOTOR
Edwin R. Morley, Two Rivers, Wis., assignor to American Machine & Foundry Company, a corporation of New Jersey
Filed Jan. 7, 1969, Ser. No. 789,513
Int. Cl. H02k 7/118
U.S. Cl. 310—41                                8 Claims

ABSTRACT OF THE DISCLOSURE

A directionally controlled rotor assembly for a synchronous A.C. motor, comprising a rotatable shaft member, a rotor member mounted on the shaft member and rotatable relative thereto, and a lost motion device coupling the rotor member to the shaft member after limited relative rotation and including a control member positively moved in a plane transverse to the axis of rotation between a retracted and a blocking extended position in response to relative rotation of the rotor member and positively held thereat to limit the driving of the shaft to one desired direction.

---

This invention relates generally to synchronous A.C. motors having directional control devices and more particularly to the rotor assembly thereof having lost motion means adapted to engage fixed stator means to limit rotation of the rotor assembly to a single desired direction.

In synchronous A.C. motors of the types embodied in clocks and time switch controls and the like when first energized normally the rotors thereof are capable of starting to rotate either clockwise or counterclockwise depending in each instance upon the polarity of the first half cycle of the energizing A.C. current and the position of the rotor. To prevent the rotors of such motors from rotating opposite to the direction desired, many arrangements have been proposed and used with limited success and acceptance. In most instances such directional controls may be complicated, require an appreciable amount of space, add appreciable weight to the rotor portion and may depend on a spring bias or the speed of rotation for operation.

An object of the present invention is to provide a directional control for a synchronous A.C. motor which is dependable, positive acting, and relatively compact and light in weight.

Another object of the present invention is to provide the foregoing control as a lost motion device.

And another object of the invention is to provide the foregoing control which is positively moved between its operative and inoperative positions and retained at each by initial rotation of the rotor member relative to the shaft of the motor.

The present invention contemplates a permanent magnet rotor assembly with directional control means for a synchronous A.C. motor having an annular series of fixed stator abutments, comprising a shaft member to be rotatably driven in a predetermined direction and having a disc portion at one end thereof disposed in a plane normal to the axis of rotation; a rotor member mounted on and rotatable relative to the shaft member, the rotor member having an annular permanent magnet face of a series of pole areas of alternately opposite polarities and a disc portion at one end of the face portion disposed in a plane spaced from and parallel to the disc portion of the shaft member; and lost motion means for permitting limited rotation of the rotor member relative to the shaft member and thereafter causing the rotor member to rotatably drive the shaft member, the lost motion means including a stop member disposed between the disc portions within the fixed abutments for engaging one of the abutments when in the extended position, the stop member being movable along an axis transverse to the axis of rotation of the shaft member between a retracted and an extended position by relative rotation between the rotor and shaft members depending upon the direction of rotation of the rotor member and being retained thereat thereby permitting the shaft to rotate in a predetermined direction and preventing its rotation in the opposite direction.

The foregoing and other objects and advantages will appear more fully hereinafter from a consideration of the detailed description which follows, taken together with the accompanying drawing wherein several embodiments of the invention are illustrated by way of example. It is to be expressly understood, however, that the drawing is for illustration purposes only and is not to be construed as defining the limits of the invention.

Figure 2:
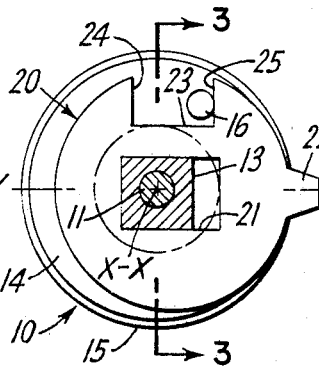
FIGURES 2, 5 and 8 are plan views of rotor assemblies, each with a portion broken away, illustrating the directional controls of FIGURES 1, 4 and 7, respectively, disposed in their extended positions.
Figure 3:
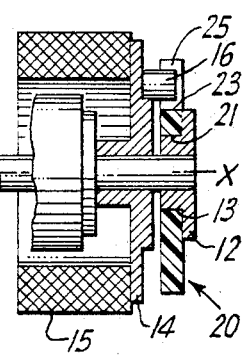
Figure 5:
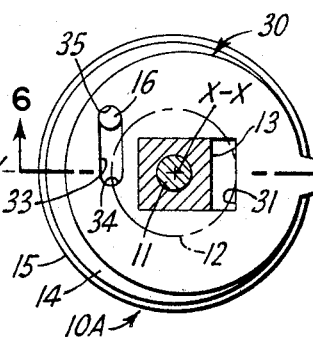
Figure 6:
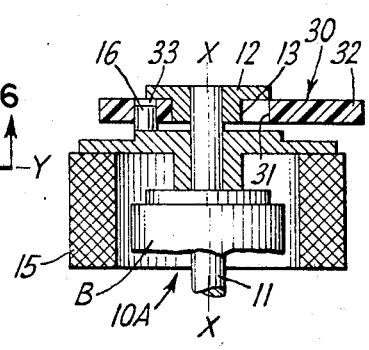
Figure 8:
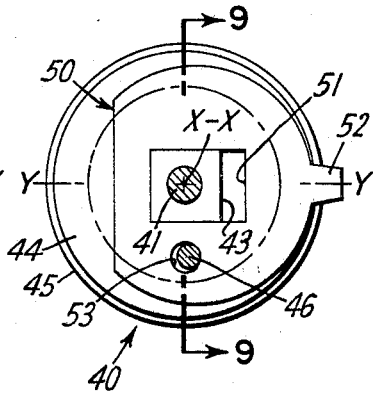
Figure 9:
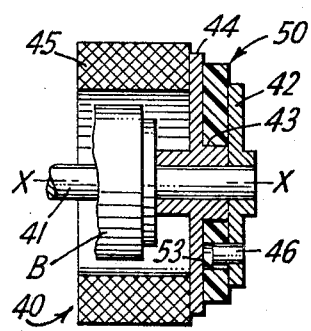

FIGURES 3, 6 and 9 are sectional views taken on lines 3—3, 6—6 and 9—9, respectively, of the respective FIGURES 2, 5 and 8.

Figure 1:
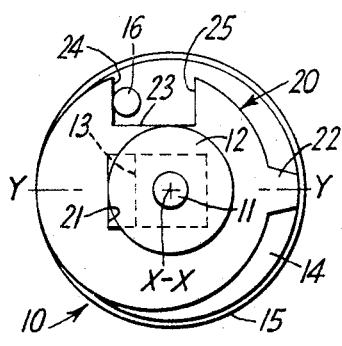
FIGURES 1, 4 and 7 are plan views of rotor assemblies each having a different form of directional control disposed in its retracted position.

Referring now to the drawings and particularly to FIGURES 1 to 3, a rotor assembly 10 is provided with a shaft member 11 supported by any suitable bearing means B for rotation on its axis X—X. A disc portion 12 with a central rectangular boss portion 13 is provided at the one end of the shaft member 11 which is shown. The disc portion 12 and boss portion 13 may be provided by a fitting member, as shown, or by forming or shaping the free end of the shaft 11. The disc portion 12 forms a head on the shaft 11 and is disposed in a plane substantially normal to the axis of rotation X—X.

A permanent magnet rotor member of any suitable construction is mounted on and rotatable relative to the shaft 11. As shown, the rotor member is provided by a disc portion 14 forming an end wall for an annular permanent magnet portion 15 fixed thereto. The disc portion 14 is disposed in a plane substantially parallel to the disc portion 12 of the shaft member 11 and is spaced therefrom by the boss portion 13. The permanent magnet portion 15 provides a face of a series of pole areas of alternately opposite polarity in a manner shown in U.S. Patent 3,164,734 granted Jan. 5, 1965, to R. A. Heinzen and assigned to the same assignee as is the present application. The rotor member of this patent is illustrative of another suitable form of construction. A pin or cam member 16, spaced radially from the axis of rotation X—X, is fixed at one end to the rotor member disc portion 14 and extends therefrom toward the shaft member disc portion 12.

A lost motion device or coupling between the shaft member 11 and the rotor member 14/15 is provided by a stop or directional control member or cam follower 20 together with the boss portion 13 and the pin or cam member 16. The stop member or cam follower 20 is provided with an elongated rectangular slot 21, and a peripheral slot 23 having a pair of spaced parallel walls 24 and 25 forming cam surfaces generally parallel to the shorter ends of the slot 21. The stop member 20 also has a tab or lug portion or protrusion 22 extending therefrom along an axis Y—Y which extends through the axis of rotation X—X, the axis Y—Y also being the major axis of the slot 21.

When the stop member 20 is embodied in the rotor assembly 10 the pin or cam member 16 is received in the open peripheral slot 23, and the boss portion 13 is disposed in the elongated slot 21 which couples the stop member 20 for rotation with the shaft member 11 on the axis X—X and for movement relative thereto on the axis Y—Y. The lug portion or protrusion 22 is disposed on and moves along the axis Y—Y which extends through the axis of rotation X—X regardless of the position of the stop member 20. Thus, the lug portion or protrusion 22 is a radially extending portion of the rotor assembly 10 and also moves radially between its extended and its retracted positions.

Counterclockwise rotation of the rotor member 14/15 as viewed in the drawings, relative to the shaft member 11 moves the pin or cam member 16 into engagement with the cam surface 24 causing the stop member 20 to assume its retracted position as shown in FIGURE 1. In its retracted position the stop member 20 overlies the rotor member 14/15 and the lug or protrusion 22 is disposed within the radial distance from the shaft 11 or its axis X—X to the face of the permanent magnet portion 14 of the rotor member. Thus, counterclockwise rotation of the rotor member 14/15 when the stop member 20 is in its retracted position will drive the shaft member 11 through the cam member 16 and surface 24, the stop member 20, and the boss 13 and the slot 21 in a counterclockwise direction which, in this instance, is the predetermined desired direction of rotation.

Similarly, clockwise rotation of the rotor member 14/15 relative to the shaft member 11 moves the pin or cam member 16 into engagement with the cam surface 25 of the peripheral slot 23. This causes the stop member 20 to move on axis Y—Y to its extended position as shown in FIGURE 2 with the lug portion or protrusion 22 extending radially beyond or outwardly of the face of the rotor member permanent magnet portion 14 to engage one of a series of fixed stator abutments (not shown) to prevent the shaft member 11 from being rotatably driven in the undesired direction. It should be understood that the relative sizes and angular relationships of the parts of the complete motor should be such that when the stop member 20 is in its extended position with the lug portion 22 engaging a fixed stator abutment thereby preventing the rotor assembly 10 from rotation in the undesired direction which, in this instance, is clockwise, the permanent magnet pole areas of the face of the rotor member permanent magnet portion 14 will be positioned relative to the salient stator poles (not shown) so that field reversal due to A.C. energization of the motor coil causes the rotor member 14/15 to start rotating in the counterclockwise or desired direction.

The peripheral slot 23 is offset approximately 90 degrees in the counterclockwise direction from the lug portion 22 for limiting the rotor assembly 10 to counterclockwise rotation as previously described. To reverse the desired direction of rotation of the rotor assembly 10, the stop member 20 is inverted so the slot 23 again is offset approximately 90 degrees from the lug portion 22 but, in this instance, in the clockwise direction. Relating this to the drawing, the slot 23 is moved by inverting the stop member 20 from its location above the axis Y—Y as in FIGURES 1 to 3 to a similar location below this axis.

Figure 4:
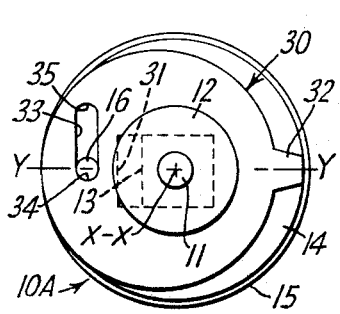

Referring now to FIGURES 4 to 6, a rotor assembly 10A includes the shaft member 11 with the disc portion 12 and boss portion 13. the rotor member having the disc portion 14 and magnet portion 15, and the pin or cam member 16 of the rotor assembly 10. The rotor assembly 10A also includes a modified or another form of stop member 30 having an elongated rectangular slot 31 and a lug portion 32 corresponding to the slot 21 and lug portion 22, respectively, of the stop member 20. In place of the peripheral slot 23, the stop member 20 is provided with an elongated slot 33 forming a track for the pin or cam member 16. The slot 33 is closed at its ends 34 and 35 which define the terminal positions of the pin or cam member 16 corresponding to those of FIGURES 1 and 2, respectively. The operation and reversal of the desired direction of rotation of the rotor assembly 10A with the stop member 30 is the same as heretofore described with respect to the rotor assembly 10 with the stop member 20.

Figure 7:
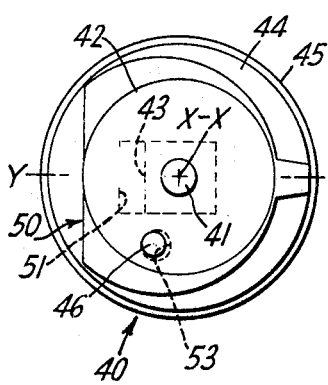

Refering specifically to FIGURES 7 to 9, a modified rotor assembly 40 includes a shaft member 41 with a disc portion 42, and a rotor member having a disc portion 44 and a permanent magnet portion 45 corresponding to the shaft member 11 with the disc portion 12 and the rotor member having the disc portion 14 and magnet portion 15, respectively, of the rotor assembly 10 or 10A. In this instance a boss 43, corresponding to the boss 13, is provided on the rotor member disc portion 44 and the pin or cam member 46, corresponding to the pin or cam member 16, is connected to the disc portion 42 of the shaft member 41.

Another modified stop member 50 corresponding to stop members 20 and 30 is provided with an elongated slot 51 corresponding to slots 21 and 31, and a lug portion or protrusion 52 corresponding to lug portions 22 and 32. In place of the peripheral slot 23 and the elongated slot 33 of stop members 20 and 30, respectively, the stop member 50 is provided with a circular opening 53 which is larger in size than the cross-sectional area of the pin or cam member 46. The stop member 50 is coupled by the boss 43 and the slot 51 for rotation with the rotor member 44/45 and for movement along axis Y—Y relative thereto. Thus, as the rotor member 44/45 rotates relative to the shaft member 41, the stop member 50 rotates on the axis X—X as it moves along the axis Y—Y between its extended and retracted positions. Except of this compound movement, the rotor assembly 40 with its stop member 50 operates in the same manner as heretofore described with respect to the rotor assemblies 10 and 10A with their respective stop members 20 and 30. The desired direction of rotation of the rotor assembly 50 is reversed, in the same manner as heretofore described, by inverting the stop member 50 thereby moving the location of the opening 53 from below the axis Y—Y as in FIGURES 7 and 8 to the same position above that axis.

It should be readily understood that the stop members 20, 30 and 50, which are actually directional control members or cam followers, can each be embodied with the other parts of either of the rotor assemblies 10 or 40.

Although several embodiments of the invention have been illustrated and described in deatil, it is to be expressly understood that the invention is not limited thereto. Various changes may also be made in the design and arrangement of the parts without departing from the spirit and scope of the invention as the same will now be understood by those skilled in the art.

What is claimed is:

1. A rotor construction for a synchronous A.C. motor, comprising
   a shaft member to be mounted for rotation,
   a rotor member mounted on said shaft member and rotatable relative thereto, and
   lost motion means coupling said members for rotation in unison after limited relative rotation therebetween, said lost motion means including a stop member positively moved in a plane normal to the axis of rotation of said shaft member between a retracted and an extended position in response to relative rotation in different directions between said rotor and shaft members and retained in the position to which it is moved thereby limiting said rotor and shaft members to rotation in unison to one predetermined direction when said stop member is in its retracted position.

2. The rotor construction in accordance with claim 1, and said stop member being a cam follower coupled to one of said shaft and rotor members for rotation therewith and for movement between its retracted and extended positions relative thereto, and the other of said shaft and rotor members having cam means engaging said cam follower thereby causing its movement to its retracted and extended positions and retaining it in the position to which it is moved.

3. The rotor construction in accordance with claim 2, and said shaft and rotor members each including a disc portion disposed in a plane normal to the axis of rotation of said shaft member and spaced from the other disc portion, said cam follower being a disc disposed between said disc portions and having a protrusion disposed on an axis extending radially from the axis of rotation of said shaft member and a slot elongated along such radial axis, and the disc portion of said one of said shaft and rotor members having a boss portion disposed in said slot engaging the elongated sides thereof for coupling said one member and disc for rotation and engaging the ends thereof each in a different one of the retracted and extended positions.

4. The rotor construction in accordance with claim 3, and said cam means being spaced radially from the axis of rotation of said shaft member and extending from said other of said shaft and rotor members toward said one member, and said cam follower disc having an opening for receiving and being engaged by said cam means.

5. The rotor construction in accordance with claim 4, and the opening being a peripheral slot providing a pair of substantially parallel cam surfaces each spaced from the other along such radial axis.

6. The rotor construction in accordance with claim 4, and the opening being an elongated slot providing a track closed at its ends for said cam means, and said closed track ends each defining the position of said cam means when said disc is in a different one of its retracted and extended positions.

7. The rotor construction in accordance with claim 4, and said cam means being a pin member, and said opening being a hole of larger diameter than the diameter of said pin member.

8. The rotor construction in accordance with claim 4, and said cam follower disc being inverted relative to said rotor member thereby reversing the one predetermined direction of rotation in unison of said shaft and rotor members.

References Cited

UNITED STATES PATENTS

| | | | |
|---|---|---|---|
| 2,972,687 | 2/1961 | Kohler | 310—41 |
| 3,403,273 | 9/1968 | Higuchi | 310—41 |
| 3,448,308 | 6/1969 | Pervorse et al. | 310—41 |

WARREN E. RAY, Primary Examiner

U.S. Cl. X.R.

310—84